United States Patent
Hahn et al.

(10) Patent No.: US 7,142,249 B2
(45) Date of Patent: Nov. 28, 2006

(54) INTERPOLATING A PIXEL FROM AN INTERMEDIATE LINE OF A FIELD

(75) Inventors: Marko Hahn, Munich (DE); Guenter Scheffler, Munich (DE); Peter Rieder, Munich (DE); Christian Tuschen, Munich (DE); Markus Schu, Erding (DE)

(73) Assignee: Micronas GmbH, Freiburg (DE)

( * ) Notice: Subject to any disclaimer, the term of this patent is extended or adjusted under 35 U.S.C. 154(b) by 460 days.

(21) Appl. No.: 10/622,073

(22) Filed: Jul. 17, 2003

(65) Prior Publication Data

US 2004/0100579 A1  May 27, 2004

(30) Foreign Application Priority Data

Jul. 17, 2002 (DE) .............. 102 32 372

(51) Int. Cl.
*H04N 7/01* (2006.01)
*H04N 11/20* (2006.01)

(52) U.S. Cl. .................. 348/458; 348/448

(58) Field of Classification Search ........... 348/458, 348/448, 449, 451, 452, 459; 382/299, 300
See application file for complete search history.

(56) References Cited

U.S. PATENT DOCUMENTS

| | | | |
|---|---|---|---|
| 4,723,163 A | 2/1988 | Skinner | 358/140 |
| 4,740,842 A | 4/1988 | Annegarn et al. | 358/160 |
| 4,941,045 A | 7/1990 | Birch | 7/1 |
| 5,081,532 A * | 1/1992 | Rabii | 348/452 |
| 5,475,438 A | 12/1995 | Bretl | 348/452 |
| 5,504,531 A * | 4/1996 | Knee et al. | 348/452 |
| 5,661,525 A | 8/1997 | Kovačević et al. | 348/452 |
| 5,910,820 A | 6/1999 | Herz et al. | 348/446 |
| 5,963,262 A * | 10/1999 | Ke et al. | 348/447 |
| 6,686,923 B1 * | 2/2004 | Ji et al. | 345/606 |

FOREIGN PATENT DOCUMENTS

| | | |
|---|---|---|
| DE | 689 27 957 | 4/1997 |
| EP | 0 018 856 | 11/1980 |
| EP | 0 946 054 | 9/1999 |

OTHER PUBLICATIONS

Haan et al., 'Deinterlacing-An Overview' Proceedings of the IEEE, IEEE. New York, US, vol. 86, No. 9, Sep. 1998, pp. 1839-1857, XP000850198 ISSN : 0018-9219.
Van De Ville et al. "Deinterlacing Using Fuzzy-Based Motion Detection" Knowledge-Based Intelligent Information Engineering Systems, 1999. Third International Conference Adelaide, SA, Australia Aug. 31-Sep. 1, 1999, Piscataway, NJ, USA. IEEE US. Aug. 31, 1999, pp. 263-267, XP010370954 ISBN.0-7803-5578-4.
Kovačević et al. Deinterlacing by Successive Approximation. IEEE Transactions on Image Processing, vol. 6, No. 2, 1057-7149, 1997.

* cited by examiner

*Primary Examiner*—Michael H. Lee
(74) *Attorney, Agent, or Firm*—O'Shea, Getz & Kosakowski P.C.

(57) ABSTRACT

The invention relates to a method for interpolating a pixel from an intermediate line of a first field of a sequence of interlaced fields.

13 Claims, 4 Drawing Sheets

INTERPOLATING A PIXEL FROM AN INTERMEDIATE LINE OF A FIELD

BACKGROUND OF THE INVENTION

The invention relates to the field of video signal processing, and in particular apparatus and method of interpolating a pixel from an intermediate line of a first field of a sequence of interlaced fields.

Television signals normally contain information for temporally sequential fields that are displayed on a screen, wherein two successive fields are interlaced. That is, each field-contains image information only in every other image line (i.e., where an image line for which image information is present in the one field is empty in the second field).

FIG. 1 illustrates two such successive fields A and B in schematic form. The first field A includes image lines A1, A2, A3 and A4 for which a received video signal contains image information. The raster positions of fields A and B are mutually offset, such that the positions of the image lines from field B correspond exactly to the positions of the empty intermediate lines of field A, and vice versa.

In order to enhance image quality, it is often desirable to generate frames for the display of a video signal containing a sequence of fields, that is, images in which no empty intermediate lines are present.

The approach is proposed in European Patent 0192292 B1 for interpolating a pixel from an intermediate line of a field, wherein two pixels are selected from the field in which the pixel is to be interpolated. That is, one pixel of an image line above the pixel to be interpolated and one pixel of an image line below the pixel to be interpolated, with the horizontal positions of the selected pixels corresponding to the horizontal position of the pixel to be interpolated. In addition, a pixel from an image line is selected from a temporally following field, and the vertical position of the selected image line corresponds to the position of the image line of the pixel to be interpolated. The horizontal position of the selected pixel corresponds to the horizontal position of the pixel to be interpolated. In the known method, the average of the image information values—usually the brightness values or luminance values—is determined for these three pixels, and for the pixel to be interpolated the image information of the pixel whose image information value comes the closest to the average so determined is selected. The pixel of the second field is, in other words, utilized for the interpolation when the image information value of this pixel lies between the image information values from the pixels of the field with the intermediate point to be interpolated. Otherwise, the image information of one of the pixels from the adjacent line of the pixel to be interpolated is selected, with the result that one of these values is doubled (i.e., displayed twice one below the other). However, this repetition of a pixel results in a positionally incorrect display in the case of pronounced vertical transitions, a result which is particularly evident in the image along diagonal edges.

Therefore, there is a need for an improved technique of interpolating a pixel from an intermediate line of a field from a sequence of interlaced fields.

SUMMARY OF THE INVENTION

In a method of interpolating a pixel from an intermediate line of a field from a sequence of interlaced fields, provision is made to select at least one first pixel from an image line above the intermediate line in the first field, and at least one second pixel from an image line below the intermediate line in the first field, and to select from a second field at least one third pixel from an image line for which the vertical position corresponds to the position of the intermediate line of the pixel to be interpolated, wherein the second field preferably temporally follows the first field. Subsequently, determination is made of an interval provided by image information values for the first and second pixels, and of the position of the image information value of the third pixel relative to the interval limits. The image information values for the first, second and third pixels are then mixed by multiplying the first image information value by a first weighting factor, the second information value by a second weighting factor, and the third image information value by a third weighting factor, then adding the weighted image information values, where the value of the third weighting factor is a function of the mathematical distance of the third information value from the closest interval limit.

The third weighting factor preferably decreases with increasing distance from the closest interval limit when the third information value lies outside the interval provided by the first and second image information values. In analogous fashion, the third weighting factor increases with decreasing distance from the center of the interval when the third image information value lies within the interval. The increase or decrease of the weighting factor preferably being proportional to the reciprocal of the distance from the closest interval limit or from the center of the interval.

The first and second weighting factors for the image information values of the first and second pixels are preferably of equal size.

In one embodiment, provision is made to set the third weighting factor to zero if its mathematical distance from the closest interval limit of the interval provided by the image information values of the first and second pixels exceeds a limit normalized for the interval width. This limit corresponds in one embodiment to the interval width or to double the interval width.

If the third image information value lies within the interval, then provision is made in one embodiment to set the third weighting factor to one. In another embodiment, the third weighting factor is set to one when its mathematical distance from the center of the interval is smaller than a specified value normalized for the interval width, this limit preferably being less than one fourth the interval width.

In another embodiment, provision is made to select the first, second and third weighting factors to be of equal size for the case in which the third image information value lies within the specified interval.

In one embodiment, mixing of the three image information values may be implemented in two steps, wherein the image information values of the first and second pixels are mixed in a first step, the image information values for example being weighted equally. The intermediate value obtained by mixing the first and second image information values is mixed with the third image information value in a second step, wherein the weighting factor of the third image information value is a function of its mathematical distance from the interval limits. For the weighting factor of the intermediate value during mixing in the second step, the applicable requirement is that this be the difference between 1 and the third weighting factor.

In selecting the third weighting factor, the mathematical distance of the third pixel from the intermediate value is preferably also taken into account.

These and other objects, features and advantages of the present invention will become more apparent in light of the following detailed description of preferred embodiments thereof, as illustrated in the accompanying drawings.

DETAILED DESCRIPTION OF THE INVENTION

Figures 1, 2:
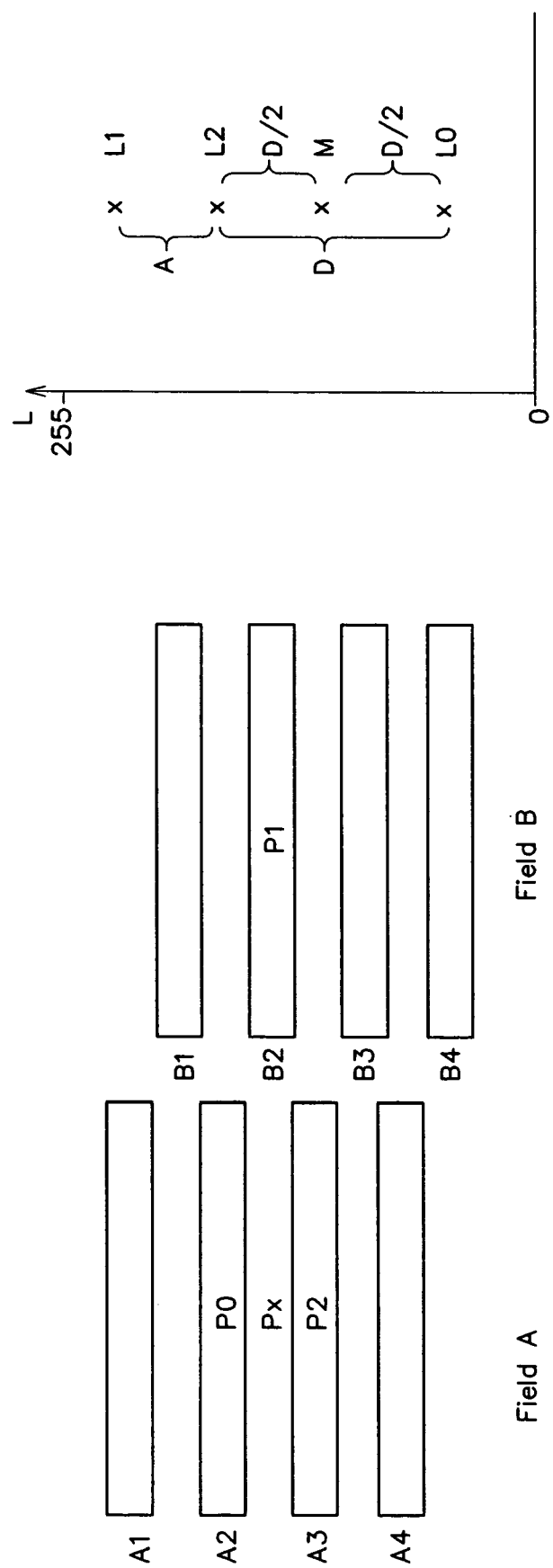
FIG. 1 provides schematic diagrams of two temporally successive fields.
FIG. 2 is a graphic diagram of the position of selected image information values in a vertically plotted image information value scale.

A method for interpolating a pixel Px from an intermediate line of a field A shown schematically in FIG. 1 includes the selection of a first pixel P0 and second pixel P2 in field A in which pixel Px of the intermediate line is to be interpolated. The first pixel P0 lies in an image line A2 that lies above the intermediate line of the pixel to be interpolated Px, and the second pixel P2 lies in an image line A3 below the intermediate line with the pixel to be interpolated Px. The horizontal position of the first and second pixels P0, P2 corresponds to the horizontal position of pixel to be interpolated Px. In addition, a third pixel P1 is selected from a field B that preferably temporally follows or precedes field A, the pixel originating in image line B2, the vertical position of which corresponds to the position of the intermediate line with the pixel to be interpolated Px in field A. The horizontal position of the third pixel P1 selected in second field B corresponds to the horizontal position of the pixel to be interpolated Px.

An image information value, such as a brightness value or luminance value L0, L1, L2 is allocated to each of these pixels P0, P1, P2, respectively. These image information values L0, L1, L2 are plotted vertically in FIG. 2 on an image information value scale L, in which the image information values in the case of luminance values may, for example, assume values of between 0 and 255.

In the example chosen in FIG. 2, the image information values L0, L1, L2 are of differing size, with the image information value L1 of the pixel P1 lying outside an interval specified by the first image information value L0 and the second image information value L2.

The image information values of selected pixels P0, P1, P2 are each multiplied by a weighting factor K0, K1, K2, and the resulting weighted image information values are added to generate an image information value Lx, which can be expressed:

$$Lx = (K0 \cdot L0) + (K1 \cdot L1) + (K2 \cdot L2) \quad (1)$$

The weighting factors K0, K1, K2 are selected such that the image information value of the resulting pixel Lx lies within the interval specified by the first and second image information values L0, L2. The third weighting factor K1 is selected as a function of its mathematical distance from the interval limits. For example, in FIG. 2 the distance of the third image information value L1 from the upper interval limit specified by the second image information value L2 is denoted by A.

The first image information value L0 and the second image information value L2 are preferably of equal weight, where the expression applying to the image information value Lx of the pixel to be interpolated Px is:

$$Lx = (1-K1) \cdot (L0+L2)/2 + K1 \cdot L1. \quad (2)$$

The fraction of the image information value Lx resulting from the first pixel L0 and the second pixel L2 corresponds to the average M shown in FIG. 2 of the image information values L0, L2, the average being multiplied by a weighting factor (1−K1), where the sum of all the weighting factors K0, K1, K2 is always equal to 1.

In order to ensure in this case that the image information value Lx of the pixel to be interpolated Px lies within the interval specified by values L0 and L1, and that the expression $0 \leq K \leq 1$ applies for the weighting factor, the following inequality must be fulfilled:

$$|(1-K1) \cdot M + K1 \cdot L1 - M| \leq |(L0-L2)/2| \quad (3)$$

For the third weighting factor K1, given the equal weighting of the first and second image information values L0, L2, the applicable expression is:

$$K1 \leq |(L0-L2)/2 \cdot L1 - M| \quad (4)$$

Figure 8:
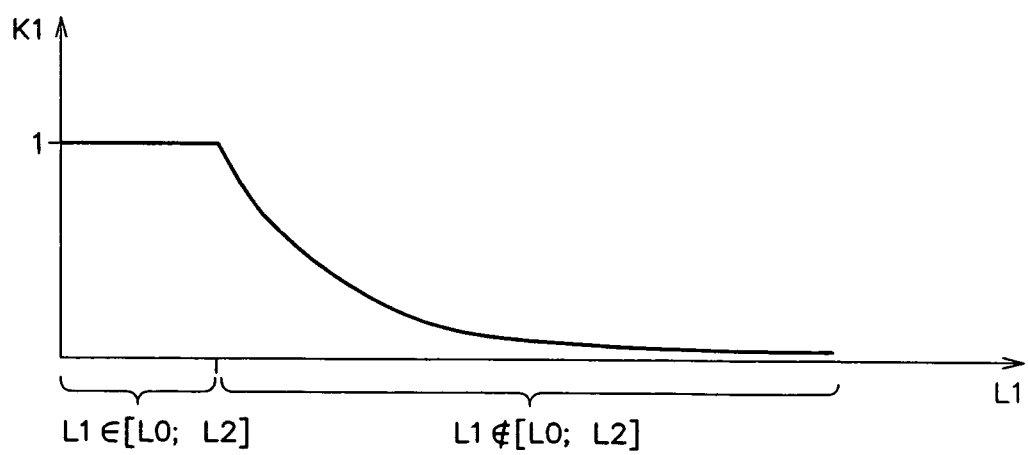
FIG. 8 is a plot of the upper limit of the third weighting factor as a function of the third image information value.

FIG. 8 is a plot of the upper limit of the third weighting factor K1 based on the above inequality, the third weighting factor in the graph of FIG. 8 being set at one when the third image information value L1 lies within the interval specified by image information values L0 and L2. In other words, FIG. 8 shows:

$$K1=1 \text{ for } L1 \text{ within } [L0; L1] \quad (5.1)$$

$$K1 \leq |(L0-L2)|/2 \cdot L1 - M \text{ for } L1 \text{ outside } [L0; L1] \quad (5.2)$$

If the third weighting factor K1 is set equal to the value indicated in equation (5.2) when the third image information value L1 is selected to lie outside the interval specified by the image information values L0 and L2, then the resulting image information value Lx lies at the respective interval limit closest to the third image information value L1. If the third image information value L1 lies within this interval, then the weighting factor may assume other values in addition to 1, as will be explained below.

The third weighting factor K1 is preferably selected such that it is considerably smaller than the limit provided in equation (4) or equation (5.2), by employing, for example, the square of the right-hand expression of the equation (4) or of the equation (5.2) for the value of the third weighting factor K1, or by squaring the denominator in the right-hand expression.

If the image information values L0 and L2 are not equally weighted, then K1 must be the applicable weighting factor so that the resulting pixel Lx lies at the interval limits, or within the interval between the upper interval limits [L1; L2]:

$$K1 \leq (M-(K0 \cdot L0+K2 \cdot L2) \pm 0.5 \cdot |(L0-L2)|)/L1 \quad (6)$$

A plus sign before the expression 0.5·|(L0−L2) causes the resulting image information value Lx to be greater than the average, and a minus sign before the expression causes the resulting image information value to be smaller than the average.

The weighting factor K1 is preferably considerably smaller than the expression provided in the right-hand part of the equation (6).

Figure 3:
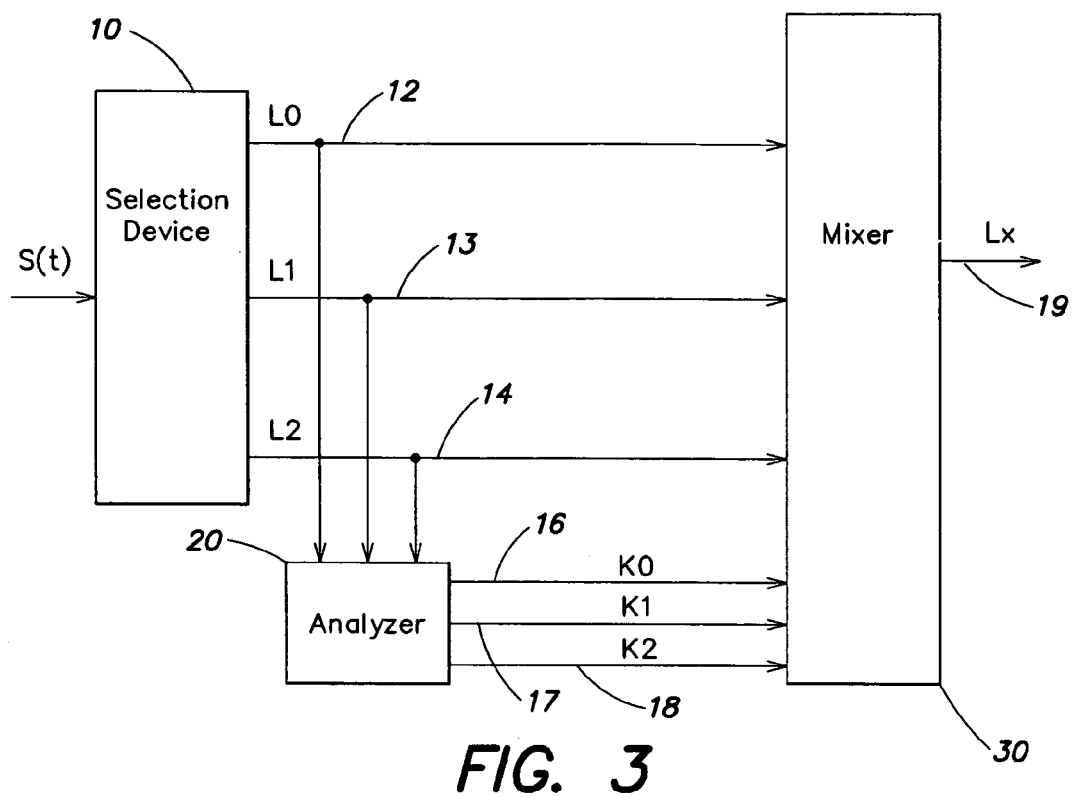
FIG. 3 is a block diagram illustration of a first embodiment of an interpolation device.

FIG. 3 a device for implementing the method according to an aspect of the invention, which device has a selection device 10 that receives the video signal S(t) and filters out the image information values L0, L1, L2 from this video signal and provides these signals on lines 12-14, respectively. The image information values L0, L1, L2 are input to an analyzer 20 that generates weighting factors K0, K1, K2 on lines 16–18, respectively, from the image information values L0, L1, L2. Mixer 30 supplies the image information value Lx on line 19 by weighting the first image information value L0 by the first weighting factor K0; the second image information value L2 by the second weighting factor K2, and the third image information value L1 by the third weighting factor K1, then adding the weighted image information values.

Figure 4:
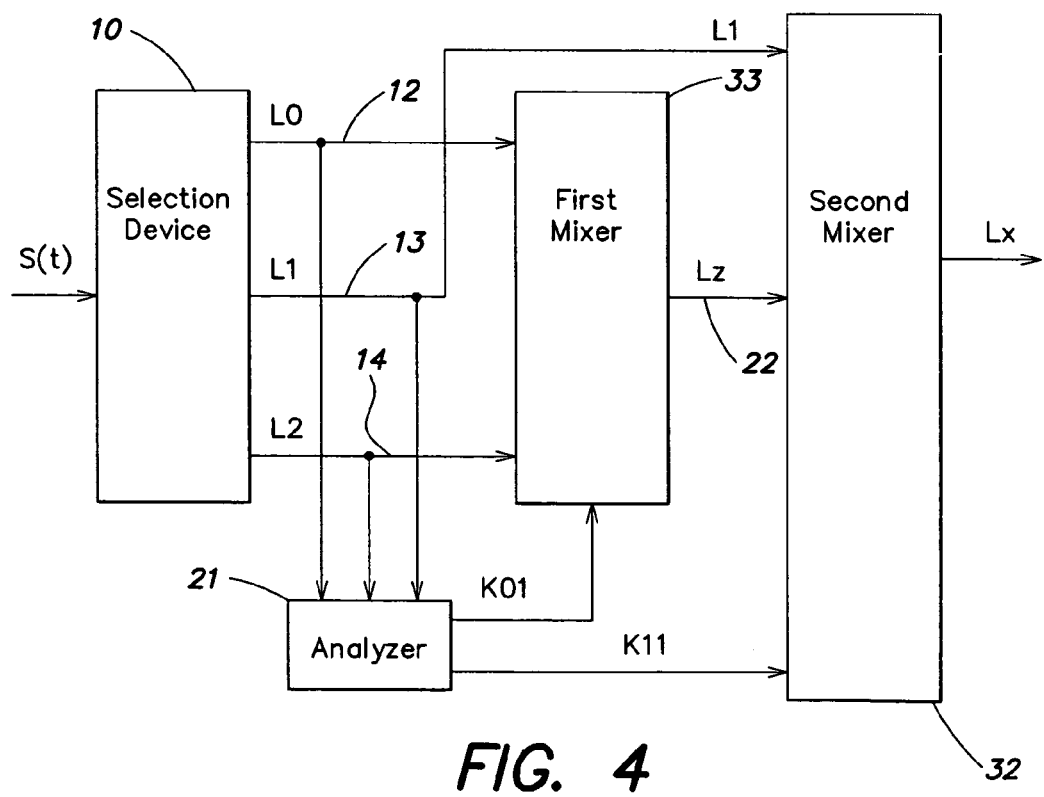
FIG. 4 is a block diagram illustration of a second embodiment of an interpolation device.

FIG. 4 shows another embodiment of an interpolation device wherein the mixing is performed in two steps by this device. In this device, the image information values L0, L1, L2 on the lines 12-14 are fed to an analyzer 21. The first image information value L0 and the second image information value L2 are fed to a first mixer 33, which provides the intermediate image information value Lz on line 22. From the image information values L0, L1, L2, the analyzer 21 generates weighting factor K01, which is fed to the first mixer 33, as well as a second mixing factor K11 that is fed to a second mixer 32. The intermediate image information value Lz on the line 22 results from mixing the first image information value L0 and the second image information value L2, where weighting factor K01 indicates, for example, how strongly the first image information value L0 is weighted—namely, for the intermediate image information value Lz, the following expression applies:

$$Lz = K01 \cdot L0 + (1-K01) \cdot L2 \quad (7)$$

The weighting factor K11 is fed to the second mixer 32 and determines how strongly the third image information value L1 is weighted. The image information value Lx output from the second mixer 32 can be expressed as:

$$Lx = K11 \cdot L1 + (1-K11) \cdot Lz \quad (8)$$

where the image information values L0, L2 correspond to the average M when the weighting factor K01=0.5.

The weighting factor K11 is generated such that the resulting image information value Lx lies within the interval limits specified by the image information values L0 and L2.

Figure 5:
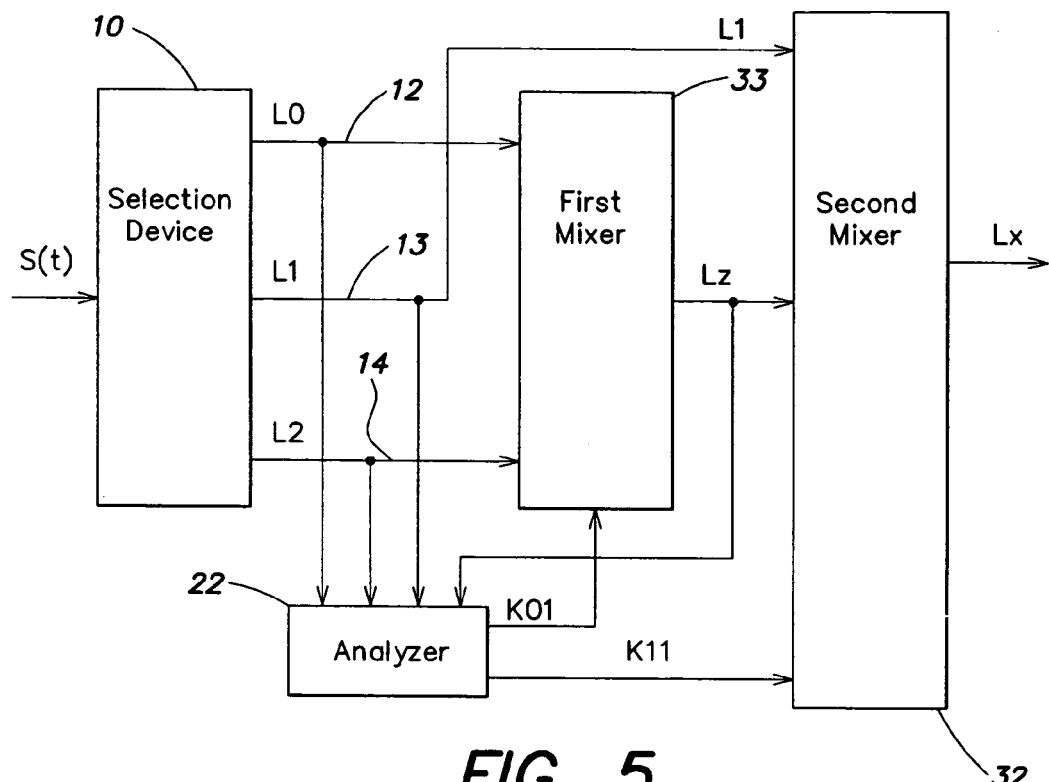
FIG. 5 is a block diagram illustration of a third embodiment of an interpolation device.

FIG. 5 shows a device which has been modified relative to that of FIG. 4 in which, in addition to the image information values L0, L2, the intermediate image information value Lz is also input to an analyzer 22 that generates weighting factors K01 and K11.

The generation of weighting factor K01, which indicates the relative weighting of the first image information value L0 and the second image information value L2 as a function of the image information values L0 and L2, enables one of these two pixels to be more strongly weighted, for example as a function of the interval width.

Figure 6:
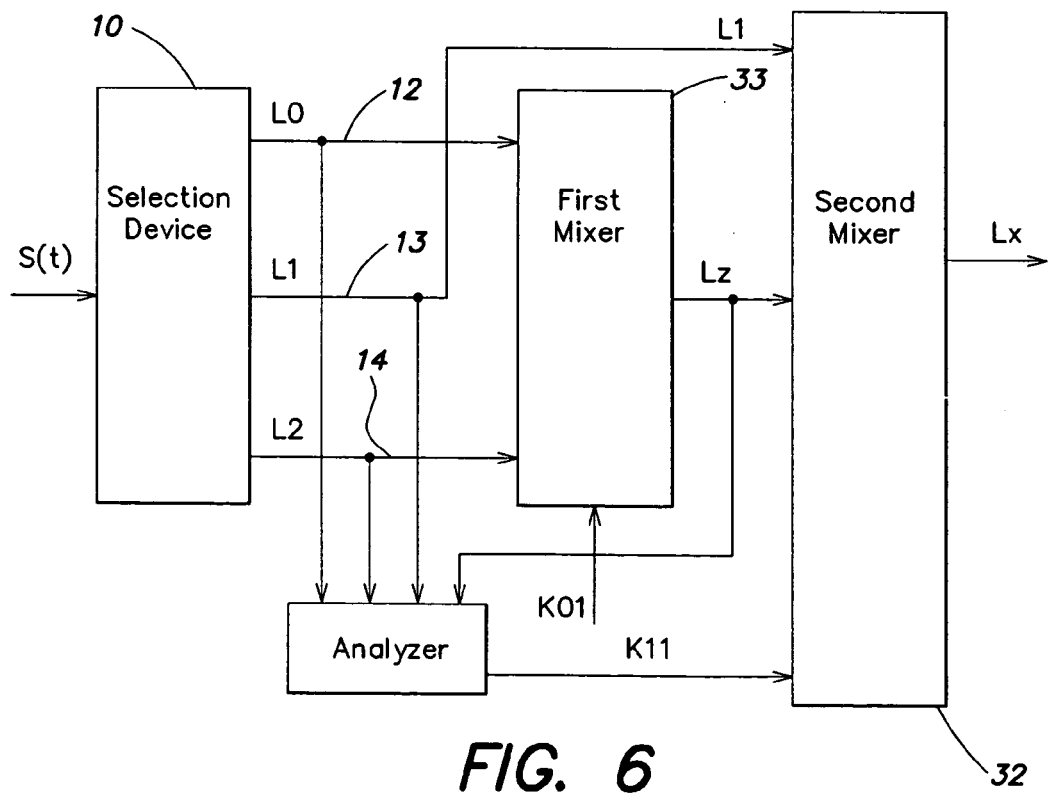
FIG. 6 is a block diagram illustration of a fourth embodiment of an interpolation device.

FIG. 6 shows a device which has been modified relative to that of FIG. 5 in that weighting factor K01 is specified from an external source to be a constant (e.g., 0.5), independent of the image information values L0, L1, L2.

Figure 7:
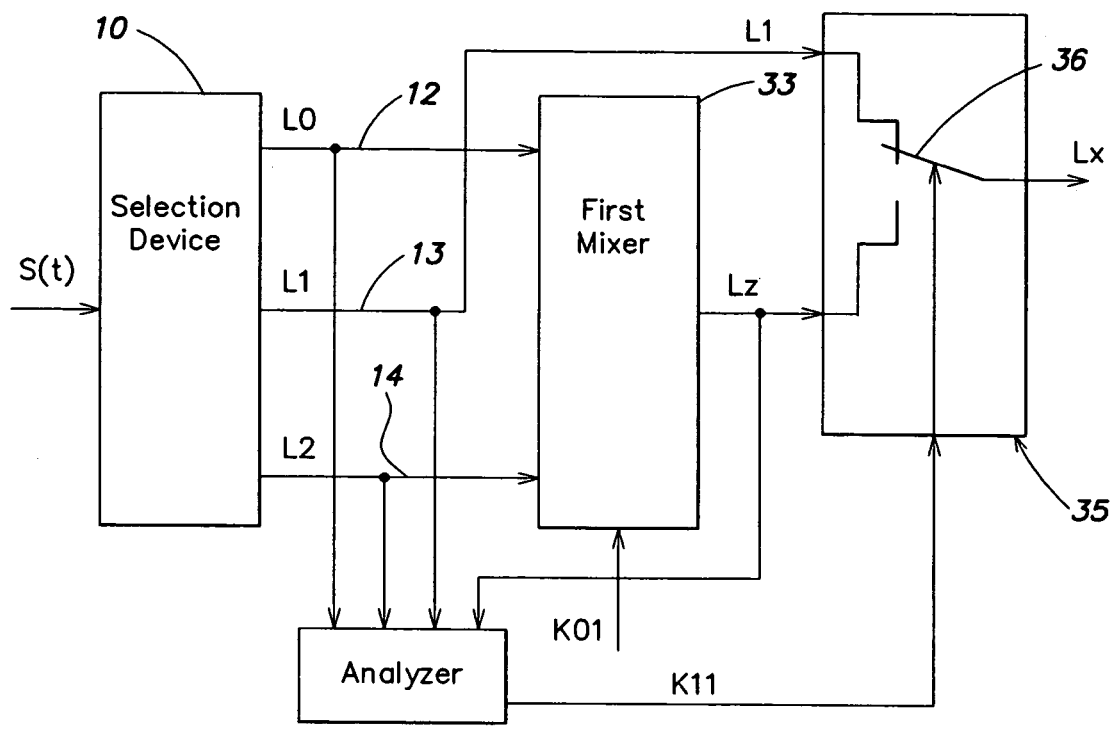
FIG. 7 is a block diagram illustration of a fifth embodiment of an interpolation device.

FIG. 7 shows a device, in which a second mixer 35 contains a switch 36 that outputs, as a function of the third weighting factor K11, either the third image information value L1 or the intermediate image information value Lz generated from the first and second image information values L0, L2 as the output signal Lx.

The invention is not restricted to image processing. It may be generally applied to signals that include a signal sequence having output values and an interpolated intermediate value that is allocated to two output values. An example of such a signal sequence is a sequence produced by oversampling an output sequence in which one interpolated intermediate value each lies temporally or spatially between two output values. Known interpolation methods for this type of intermediate value generation often provide insufficient results, specifically undesirable overshoots, for signal jumps, that is, in the case of large amplitude differences for the two output values on which the interpolated intermediate value depends.

This problem is remedied by application of the method outlined above to the signal sequence having output values and interpolated intermediate values, wherein one of the output values is processed based on the first image information value, the second of the output values is processed based on the second image information value, and the intermediate value that is a function of the first and second output values is processed based on the third image information value. The signal generated according to the invention provides a corrected interpolated intermediate value.

Although the present invention has been shown and described with respect to several preferred embodiments thereof, various changes, omissions and additions to the form and detail thereof, may be made therein, without departing from the spirit and scope of the invention.

What is claimed is:

1. A method of interpolating a pixel from an intermediate line of a first field in a sequence of interlaced fields, comprising:

selecting at least one first pixel to which a first image information value is allocated from an image line lying above the intermediate line in the first field, and at least one second pixel to which a second image information value is allocated from an image line lying below the intermediate line in the first field;

selecting at least one third pixel to which a third image information value is allocated from an image line, the vertical position of which corresponds to the position of the image line of the pixel to be interpolated, from a second field;

determining a limit provided by the first and second image information values;

determining the position of the third image information value relative to the interval limits;

mixing the image information values by multiplying the first image information value by a first weighting factor, the second image information value by a second weighting factor, and the third image information value by a third weighting factor, then adding the weighted image information values to obtain an image information value for the pixel of the intermediate line, where the value of the third weighting factor is a function of the mathematical distance of the third information value from the interval limits, and the weighting factors are selected such that the image information value of the pixel to be interpolated lies with the interval limits.

2. The method of claim 1, wherein the third weighting factor decreases with increasing distance from the closest interval limit when the third image information value lays outside the interval.

3. The method of claim 2, wherein the third weighting factor decreases in proportion to the distance from the closest interval limit when the third image information value lays outside the interval.

4. The method of claim 2, wherein the first and second weighting factors are of equal size.

5. The method of claim 1, wherein the third weighting factor is set to zero when its mathematical distance from the closest interval limit exceeds a specified value normalized for the interval width.

6. The method of claim 5, wherein the third weighting factor is set to zero when its mathematical distance from the closest interval limit is more than double the interval width.

7. The method of claim 1, wherein the first, second, and third weighting factors are set to equal size when the third image information value lays within the interval.

8. The method of claim 1, wherein the value of the third weighting factor increases with decreasing distance from the center of the interval when the third image information value lays within the interval.

9. The method of claim 1, wherein the third weighting factor is set to one when the third image information value lays within the interval.

10. The method of claim 1, wherein the third weighting factor is set to one when the mathematical distance of the third image information value from the center of the interval is smaller than a specified value normalized for the interval width.

11. The method of claim 9, wherein the third weighting factor is set to one when the mathematical distance of the third image information value from the center of the interval is smaller than one fourth the interval width.

12. The method of claim 1, wherein first an intermediate value is generated from the first image information value and the second image information value by multiplying the first image information value by a first weighting factor, and the second image information value by a second weighting factor, then adding the weighted image information values; and in which subsequently the intermediate value is mixed with the third image information value by weighting the intermediate value and the third image information value, then adding the weighted intermediate value and weighted third image information value to generate the image information of the pixel to be interpolated, wherein the weighting factor of the third image information value is a function of its mathematical distance from the interval limits or the intermediate value.

13. The method of claim 12, wherein the weighting factor of the third pixel is a function of the mathematical distance from the intermediate value.

* * * * *

UNITED STATES PATENT AND TRADEMARK OFFICE
CERTIFICATE OF CORRECTION

PATENT NO. : 7,142,249 B2
APPLICATION NO. : 10/622073
DATED : November 28, 2006
INVENTOR(S) : Hahn et al.

It is certified that error appears in the above-identified patent and that said Letters Patent is hereby corrected as shown below:

Column 1
Line 6, delete "apparatus and method of"
Line 13, delete "field-" and insert --field--

Column 2
Line 45, delete "one fourth" and insert --one-fourth--

Column 3
Line 32, delete "lies" and insert --lays--
Line 33, delete "lies" and insert --lays--
Line 36, before "pixel" insert --the--
Line 43, before "second" insert --the--
Line 66, delete "lies" and insert --lays--

Column 4
Line 21, delete "lies" and insert --lays--
Line 35, delete "lies" and insert --lays--
Line 44, delete "lie" and insert --lay--
Line 48, delete "lies" and insert --lays--
Line 61, delete "lies" and insert --lays--

Column 5
Line 7, after FIG. 3, insert --illustrates--
Line 15, delete "Mixer" and insert --The mixer--
Line 51, delete "lies" and insert --lays--
Line 57, before "factors" insert --the--
Line 58, before "weighting" insert --the--
Line 65, before "weighting" insert --the--

UNITED STATES PATENT AND TRADEMARK OFFICE
CERTIFICATE OF CORRECTION

PATENT NO. : 7,142,249 B2
APPLICATION NO. : 10/622073
DATED : November 28, 2006
INVENTOR(S) : Hahn et al.

It is certified that error appears in the above-identified patent and that said Letters Patent is hereby corrected as shown below:

Column 6
Line 13, delete "lies" and insert --lays--

Signed and Sealed this

Thirtieth Day of January, 2007

JON W. DUDAS
*Director of the United States Patent and Trademark Office*